US009767000B1

(12) United States Patent
Chida et al.

(10) Patent No.: US 9,767,000 B1
(45) Date of Patent: Sep. 19, 2017

(54) SELECTING APPROPRIATE SUBSETS OF SOFTWARE TESTS

(75) Inventors: Suzuko Chida, Bellevue, WA (US); Nirav P Desai, Issaquah, WA (US); Ravikumar Makam, Bellevue, WA (US); Kyung Deuk Park, Bellevue, WA (US); Kyle Andrew Farrell, Seattle, WA (US); Michael C. Moore, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1400 days.

(21) Appl. No.: 12/886,134

(22) Filed: Sep. 20, 2010

(51) Int. Cl.
G06F 9/44 (2006.01)
G06F 11/36 (2006.01)

(52) U.S. Cl.
CPC .................................. *G06F 11/36* (2013.01)

(58) Field of Classification Search
None
See application file for complete search history.

(56) References Cited

U.S. PATENT DOCUMENTS

| | | | | |
|---|---|---|---|---|
| 5,778,169 A * | 7/1998 | Reinhardt | | 714/38.1 |
| 6,536,036 B1 * | 3/2003 | Pavela | | 717/125 |
| 6,561,425 B2 * | 5/2003 | Kresina et al. | | 235/462.01 |
| 6,609,216 B1 * | 8/2003 | Almy et al. | | 714/25 |
| 6,748,584 B1 * | 6/2004 | Witchel et al. | | 717/136 |
| 7,222,340 B2 * | 5/2007 | Willis, II | | 717/168 |
| 7,496,906 B2 * | 2/2009 | Black-Ziegelbein et al. | | 717/145 |
| 7,603,660 B2 * | 10/2009 | Davia et al. | | 717/128 |
| 7,844,929 B2 * | 11/2010 | Chaturvedula et al. | | 716/136 |
| 8,464,207 B2 * | 6/2013 | Pouliot | | 717/104 |
| 8,752,001 B2 * | 6/2014 | Sureka et al. | | 717/102 |
| 2005/0166094 A1 * | 7/2005 | Blackwell et al. | | 714/38 |
| 2005/0229159 A1 * | 10/2005 | Haba et al. | | 717/122 |
| 2005/0262021 A1 * | 11/2005 | Wood et al. | | 705/44 |
| 2007/0011669 A1 * | 1/2007 | Varma et al. | | 717/168 |
| 2012/0084756 A1 * | 4/2012 | Subramanian et al. | | 717/124 |
| 2012/0254665 A1 * | 10/2012 | Pasala et al. | | 714/33 |
| 2012/0324427 A1 * | 12/2012 | Provost et al. | | 717/126 |
| 2013/0067437 A1 * | 3/2013 | Chen et al. | | 717/124 |

OTHER PUBLICATIONS

"Gcov—Using the GNU Compiler Collection (GCC)", retrieved on Sep. 15, 2010 at <<http://gcc.gnu.org/onlinedocs/gcc/Gcov.html>>, 1 page.
"LCOV", ohloh:Root, retrieved on Sep. 16, 2010 at <<http://www.ohloh.net/p/LCOV>>, 3 pages.
"Trucov—Project Hosting on Google Code", retrieved on Sep. 15, 2010 at <<http://code.google.com/p/trucov/>>, 3 pages.

\* cited by examiner

*Primary Examiner* — Evral E Bodden
(74) *Attorney, Agent, or Firm* — Lee & Hayes, PLLC (57) ABSTRACT

An environment and techniques for intelligently selecting which tests of multiple different tests to run on a particular section or sections of code, such as one or more lines of code that a developer has altered, are described herein. In this manner, the techniques may allow developers to receive feedback on their software more quickly by running a subset of tests, rather than each test in a predefined set of tests.

24 Claims, 5 Drawing Sheets

SELECTING APPROPRIATE SUBSETS OF SOFTWARE TESTS

BACKGROUND

Software developers not only write code, but also frequently update the code when updating a corresponding software package or service. After writing or updating a piece of software, the developers often run tests to ensure that the individual units of source code are fit for use. After determining that the units are in fact fit for use, the developers may also perform integration testing to determine if the new code or the updates functions properly with other pieces of existing software and, further, whether this new code adversely affects the existing software. Finally, the developers may test an entire system, including the newly created updates, to determine whether the system as a whole functions properly.

While methods of software testing are useful in ensuring that software and systems that run the software operate correctly, these testing methods often require an undue amount of time and resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an environment and techniques for intelligently selecting which tests of multiple different tests to run on a particular section or sections of code, such as one or more lines of code that a developer has altered.

As discussed above, software development may involve continuously developing code and running tests against the code to determine whether or not the code is fit for use. Developers typically desire tests to give developers feedback regarding the quality of the code changes. However, as a software system becomes large and complex, the number of tests may increase to a point where running the tests takes a significant amount of time. The techniques described below may allow developers to receive feedback on their software more quickly by running a subset of tests, rather than each test in a predefined set of tests.

To do so, the techniques described below may maintain a code coverage map that maps each portion of code within a software system to one or more tests. That is, this map identifies, for each section or piece of code within the system, which tests within a set of predefined tests execute the respective piece of code when the test is performed. The map then uses this association to link sections of code to tests within the set of tests. The code coverage map may map tests to sections of code on a per-line basis, a per-class basis, a per-method basis, or in any other manner.

Thereafter, when a developer makes a change to a section of code and requests to test the altered section of code, a testing service may consult the code coverage map to identify which tests of the predefined set of tests actually execute or "touch" the altered code. In other words, the testing service is able to leverage the code coverage map to identify tests that are relevant to the changed code. Therefore, the testing service may run this subset of tests on the changed code rather than the entire set of tests. By doing so, the testing service is able to more quickly provide feedback to the developer regarding the quality of the code changes. When the developer finalizes his or her code changes based on the feedback that the testing service provides (perhaps in an iterative process), the developer may choose to test the code against a different subset of tests or, possibly, against the entire set of tests, rather than simply a subset.

Example Environments

Figure 1:
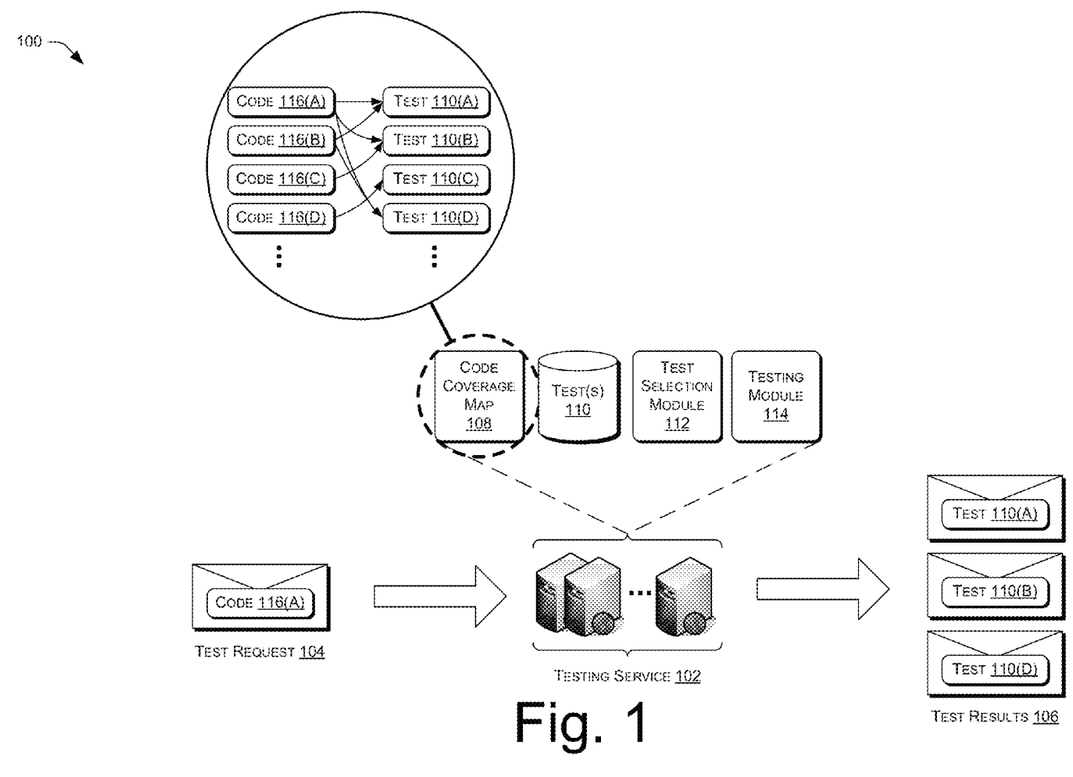
FIG. 1 illustrates an environment that includes a testing service configured to receive a request to test one or more pieces of code and, in response, to select a subset of tests to run on the received pieces of code. In some instances, the testing service maintains a code coverage map to select the subset by identifying which tests execute or otherwise touch one or more of the received pieces of code.

FIG. 1 illustrates an example environment 100 that may implement the described techniques. As illustrated, the environment 100 includes a testing service 102 that functions to receive one or more test requests from developers writing or altering code and, in response, to output test results after running one or more tests on the received code.

FIG. 1, for instance, illustrates that the test service 102 may receive a test request 104 and, in response, may output tests results 106 after running one or more tests on the received code. In some instances, the testing service 102 runs tests that are relevant to the received code (e.g., tests that execute the received code when performed) while refraining from running tests that are irrelevant to the received code (e.g., tests that do not execute the received code when performed). In this manner, the testing service 102 provides feedback more quickly to a developer or other user who sends the test request 104.

FIG. 1 illustrates that the testing service 102 may include or otherwise have access to a code coverage map 108, one or more tests 110, a test selection module 112, and a testing module 114. As illustrated, the code coverage map 108 maps pieces of code of a software system 116(A), 116(B), etc. to corresponding tests 110(A), 110(B), etc. In some instances, the testing service 102 creates the code coverage map 108 using tools that run the entire set of tests 110 on the entire software system and determine which tests touch or execute which pieces of code of the software system. FIG. 1, for instance, illustrates that test 110(A) executes at least pieces of code 116(A) and 116(B), when performed, while not executing pieces of code 116(C) and 116(D).

The code coverage map 108, therefore, uses this information to map the pieces of code 116 to the tests 110, which may comprise functional tests, performance tests, or any other category of test type. For instance, in this example the piece of code 116(A) is associated with the tests 110(A), 110(B), and 110(D), but not the test 110(C), meaning that the tests 110(A), 110(B), and 110(D) each execute the piece of code 116(A) when performed, while the test 110(C) does not. Similarly, in this example the piece of code 116(B) is associated with the tests 110(A) and 110(D), the piece of code 116(C) is associated with the test 110(B), and the piece of code 116(D) is associated with the test 110(C). While the code coverage map 108 of FIG. 1 illustrates several pieces of code, it is to be appreciated that the map 108 may map thousands or even millions of pieces of code to hundreds or even thousands of tests in other embodiments. In addition, the term "piece of code" may represent a line of code, a class, a method, or a section of code of any other granularity.

FIG. 1 illustrates that the test request 104 comprises the piece of code 116(A) or an identification of the piece of code 116(A). That is, the test request 104 indicates that a developer desires to test the piece of code 116(A), which the developer may have recently altered. In response to receiving the test request, the test selection module 112 may analyze the code coverage map 108 to determine a subset of tests that are relevant to the piece of code 116(A). In this illustrated example, the test selection module 112 determines that the tests 110(A), 110(B), and 110(D) execute the piece of code 116(A) and, hence, are relevant.

The test selection module 112 provides an indication of these tests to the testing module 114, which proceeds to run this subset of tests on the piece of code 116(A) while refraining from running a remainder of the tests on the piece of code 116(A). By doing so, the testing module 114 creates the test results 106. As illustrated, the test results 106 may comprise a summation of the results for each of the relevant tests 110(A), 110(B), and 110(D). After generating these results 106, the testing service 102 may provide these results back to the requesting developer in some instances. By only running the subset of the tests rather than each of the tests 110, the testing service 102 may deliver these results 106 more quickly than traditional testing services.

Figure 2:
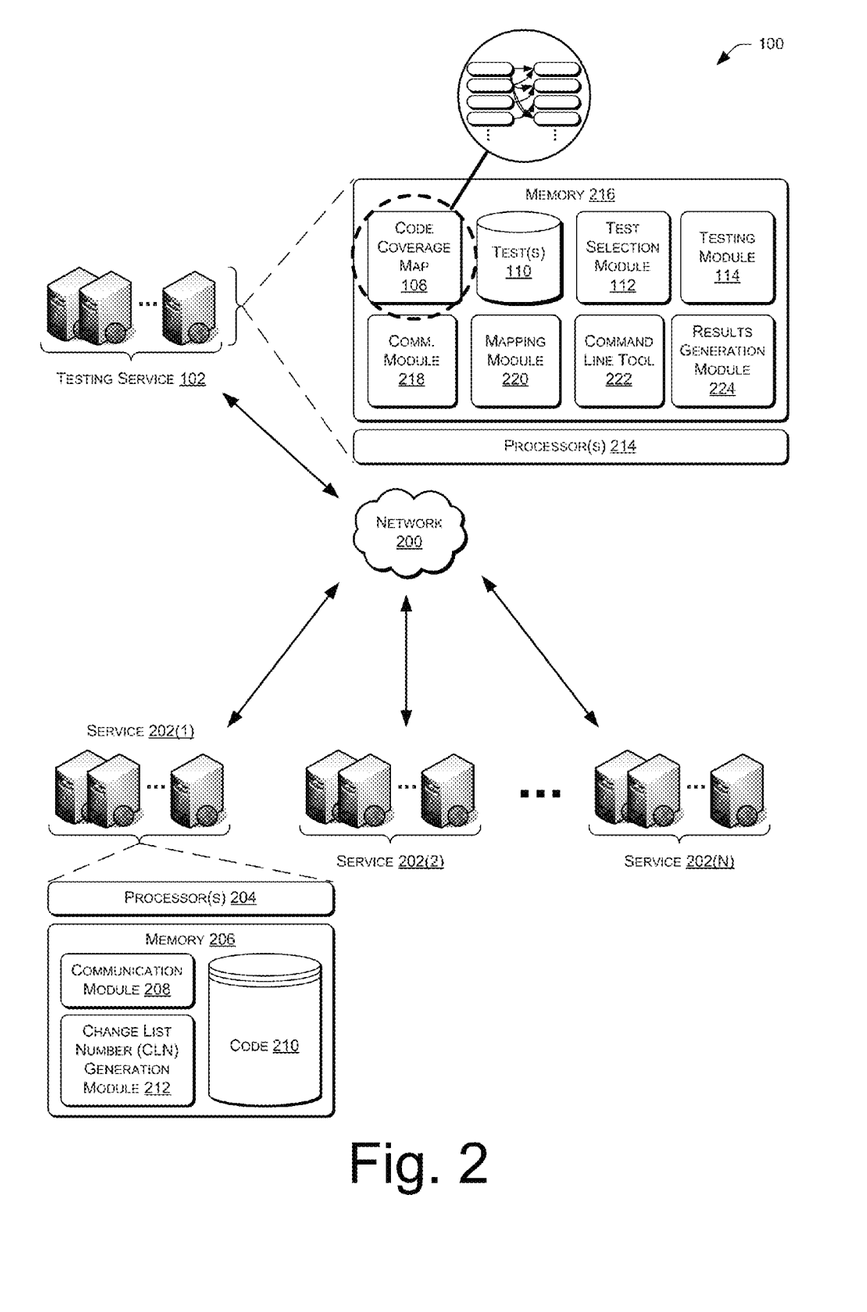
FIG. 2 illustrates the environment of FIG. 1 in further detail. In this example, the testing service forms a portion of a distributed-services environment, each service of which may utilize the testing service to test their respective code changes.

FIG. 2 illustrates an example of the environment 100 in greater detail. This example illustrates that the environment 100 may comprise a distributed-services environment that includes a plurality of different services 202(1), 202(2), . . . , 202(N) that communicate with one another over a network 200. These services may depend upon one another, while being separately controlled. Even when separately controlled, these services may or may not each be associated with a common entity or owner. In some instances, a common entity owns and operates each of the services 202(1)-(N), which together function to provide a publicly accessible website associated with the common entity.

The network 200 is representative of any one or combination of multiple different types of networks, such as the Internet, cable networks, cellular networks, wireless networks, and wired networks. The network 200 may be a public or a private network. Furthermore, while FIG. 1 illustrates several arrows, each of the illustrated services may communicate directly or indirectly with one another via the network 200.

In some instances, each of the services 202(1)-(N) may operate to perform a particular task for a common or different entities. For instance, each service may perform one or more discrete tasks for a common company, such as an e-commerce retailer, an educational institution, a governmental agency, or any other entity that operates different services to perform different tasks. In the example of the e-commerce retailer, for instance, a first service may implement and maintain a catalog of items offered for acquisition, a second service may implement customer ordering, a third service may implement customer payments, a fourth service may implement and maintain user accounts and so on.

In this and other examples, the discrete services are operated and controlled separately, but rely upon one another for various inputs. For instance, a customer ordering service may place and control orders on behalf of customers. To do so, however, the customer ordering service may send requests to and receive replies from the catalog service, the payments service, the user account service, and the like. For instance, the catalog service may provide information about the item that a customer wishes to purchase, the payments service may maintain information regarding payment instruments associated with the customer, the user account service may maintain shipping preferences for the customer, and the like. As such, each of these services 202(1)-(N) may desire to ensure that updates to the respective service not only function properly within the service, but also within the distributed-services environment 100 more generally.

In this example, the environment 100 further includes the testing service 102 described above with reference to FIG. 1. As illustrated, the testing service 102 and each of the distributed services 202(1)-(N) is embodied as one or more servers that collectively have processing and storage capabilities to receive and send requests. These servers may be embodied in any number of ways, including as a single server, a cluster of servers, a server farm or data center, and so forth, although other server architectures (e.g., mainframe) may also be used. Alternatively, some or all of the services 202(1)-(N) and the testing service 102 may be embodied as a client device, such as desktop computer, a laptop computer, and so forth.

In any of the above instances, the services 202(1)-(N) may each include one or more processors and memory. FIG. 2, for instance, illustrates that the service 202(1) includes one or more processors 204 and memory 206. The memory 206 (as well as each other memory described herein) may represent computer-readable media, such as volatile and/or nonvolatile memory. Thus, the memory 206 may include, but is not limited to, RAM, ROM, EEPROM, flash memory, or other memory technology, or any other medium which can be used to store content items or applications and data.

In this example, the memory 206 stores or otherwise has access to a communication module 208, a database of code 210, and a change list number (CLN) generation module 212. While FIG. 2 illustrates these components as residing on the service 202(1), these components may reside throughout the environment 100 in other instances. For instance, the code 210 may represent code of the entire software system of the environment 100 and, as such, may reside throughout the environment 100. Further, while FIG. 2 illustrates details of the example service 202(1), the services 202(2)-(N) may include similar or different configurations.

The service 202(1) may employ the communication module 208 to send test requests to the testing service 102. Before doing so, however, an operator of the service 202(1) may alter or modify pieces of the code 210. For instance, the developer may desire to update different portions of the service 202(1) via these code changes. After making the changes, the CLN generation module 212 may generate a CLN that uniquely identifies this set of changes. In some instances, the CLN generation module 212 resides remotely from a device that the developer operates, as does the code 210 on which the developer operates.

In either instance, the developer may send a test request to the testing service, with the request including the unique CLN for the code changes. The testing service 102 may then use this unique CLN to request and receive the altered code from its storage location prior to running tests on the altered code, as discussed in detail below. While FIG. 2 illustrates that the service 202(1) may generate and provide unique CLNs for requested code changes, in other implementations the service 202(1) may instead send the altered code along with the request. In addition, in some instances the altered code comprises at least one individual line of code, and the request received from the developer specifies whether to run tests that execute the individual line of code, a class that includes the individual line of code, or a method that includes the individual line of code. As such, the testing service 102 allows the developer the ability to vary the granularity at which the testing service 102 tests the received code.

FIG. 2 illustrates, in further detail, the testing service 102, which includes one or more processors 214 and memory 216. As described above with reference to FIG. 1, the memory 216 may store or have access to the code coverage map 108, the set of tests 110, the test selection module 112, and the testing module 114. In addition, the memory 216 may store or have access to a communication module 218, a mapping module 220, a command line tool 222, and a results generation module 224.

Similar to the communication module 208 on the service 202(1), the communication module 218 may allow the testing service 102 to receive test requests from the services 202(1)-(N) and, in response, to provide test results. The mapping module 220, meanwhile, may function to map pieces of code (e.g., the code 210) to different ones of the tests 110. While FIG. 2 illustrates the testing service 102 storing the mapping module 220, in other instances the testing service 102 may instead leverage tools provide by one or more other entities.

Figure 3:
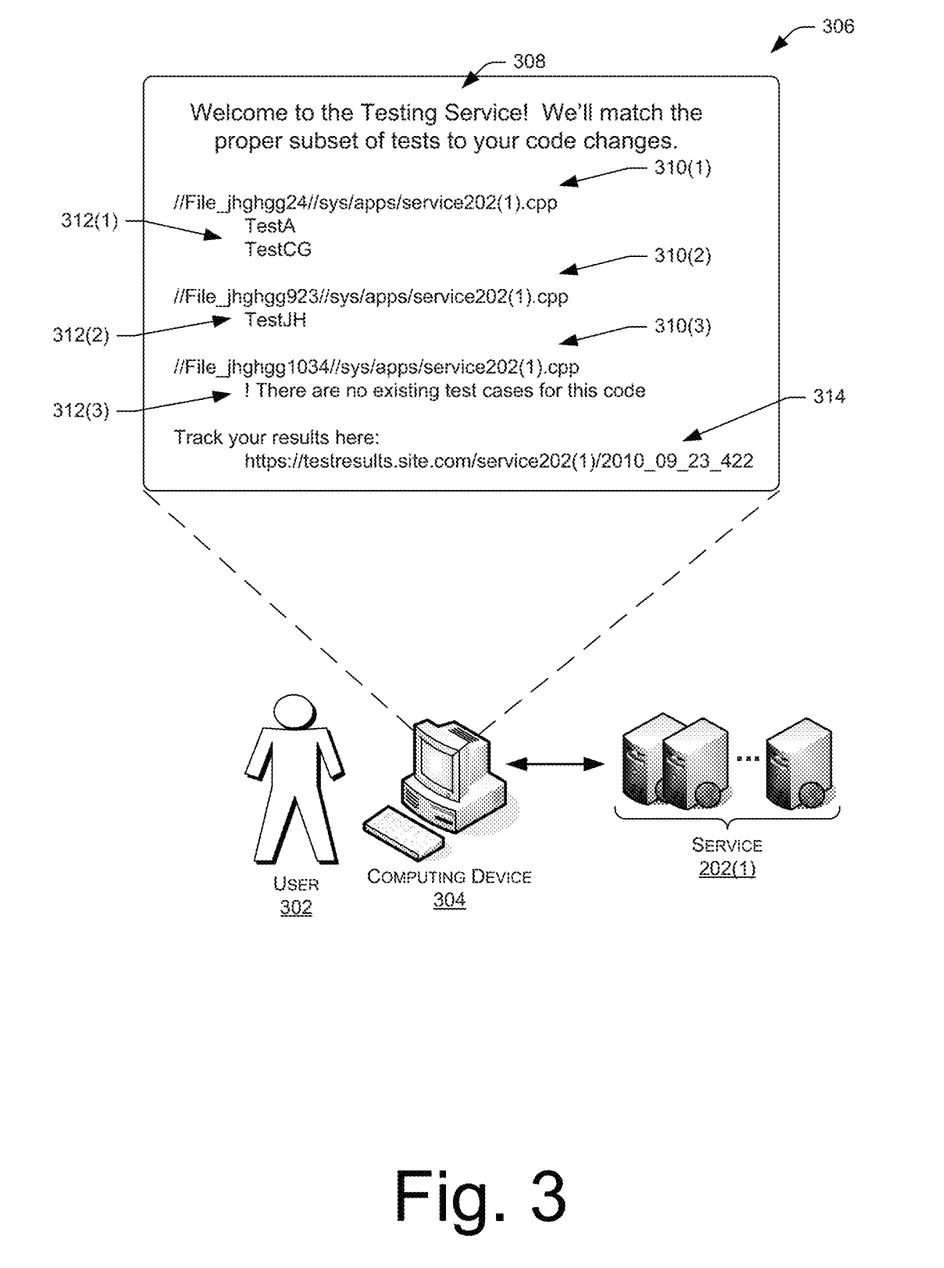
FIG. 3 illustrates an example command line interface that a user of a service of the environment of FIG. 2 may employ to test code changes and to receive test results in response. The testing service may provide the results shown in the command line interface, which may include identifying which tests the testing service ran on the tested code.

In some instances, the testing service 102 employs the command line tool 222 for exposing a command line interface to operators and/or developers of the services 202(1)-(N). The operators or developers may then use this command line interface to make test requests and, in some instances, to receive test results from the testing service 102. FIG. 3 and a corresponding discussion provide details of an example command line interface below. While FIGS. 2 and 3 illustrate an example where the services 202(1) and the testing service 102 communicate via a command line interface, these systems may interact with one another via a web interface or in any other manner in other embodiments.

The results generation module 224 may generate results in response to receiving test requests, such as the test results 106 described above with reference to FIG. 1. In some instances, the results generation module 224 receives the test results for the relevant subset of tests from the testing module 114 and collates these results into a file suitable for output to a developer or other user. For instance, the results generation module 224 may collate and surface this information on the command line interface described briefly above and in detail below, or in any other manner. In some instances, the results generation module 224 may create a pointer (e.g., a uniform resource locator (URL) or the like) to the results, and may thereafter provide this pointer for output on the command line interface or otherwise.

Example Command Line Interface

FIG. 3 illustrates an example command line interface with which a user 302 of a service of the environment of FIG. 2 may employ to test code changes and to receive test results in response. The user 302 may represent a developer or operator of the example service 202(1), or any other user associated with or having access to the service 202(1). In this example, the user 302 employs a computing device 304 to request that the testing service 102 run tests on one or more altered pieces of code and, in response, to receive test results from the testing service 102.

In this example, the testing service 102 provides test results 306 in the illustrated command line interface, although in other examples the testing service 102 may provide the test results 306 in any other suitable manner (e.g., via email, via a downloadable log, etc.). In this example, the command line interface includes a heading 308, welcoming the user 302 to the testing service 102 and stating that the testing service 102 will locate the proper subset of tests for the code changes made by the user 302 (rather than simply running the entirety of the tests 110 against the code changes).

Prior to receiving and viewing the test results 306 on the command line interface, the user 302 may provide a CLN or other indication of the altered code. For instance, the user 302 may run a single script on the command line interface that identifies a unique CLN, which in turn identifies a set of files that the user 302 desires to test. In response to the user 302 requesting to run this script, the testing service 102 may identify the code changes that map to the CLN and may thereafter run the subset of tests indicated by the code coverage map, as described above. Thereafter, the testing service 102 may serve (and the computing device 104 may display) the test results.

Here, the test results indicate that he user 302 uploaded a CLN that identified three different pieces of code 310(1), 310(2), and 310(3) that the user 302 altered. While FIG. 3 illustrates an example format of these files (.cpp), other embodiments may include files of any other format. In addition to identifying the altered pieces of code 310(1)-(3), the test results 306 may identify which tests the testing service ran on the tested code. Here, for instance, the test results show that the testing service ran the subset of tests 312(1) consisting of "TestA" and "TestCG" for the first altered piece of code 310(1), and the subset of tests 312(2) consisting of "TestJH" for the second altered piece of code 310(2). In addition, the test results 306 include an indication 312(3) that the testing service 102 did not locate a test within the tests 110 that executes the third altered piece of code 310(3) (and, hence, did not find a test that is relevant to this piece of code). In some instances, the indication 312(3) may also encourage the user 302 to develop and/or upload a test for testing this piece of code 310(3).

Finally, the command line interface includes a pointer 314 to the full results of the subset of tests ran on the altered pieces of code. Here, the pointer 314 comprises a URL pointing to a webpage detailing the full results of TestA and TestCG on the altered piece of code 310(1), and TestJH for the altered piece of code 310(2). While this example provides a URL pointer, other examples may include any other type of pointer or may instead include the full results on the command line interface itself.

Example Processes

Figure 4:
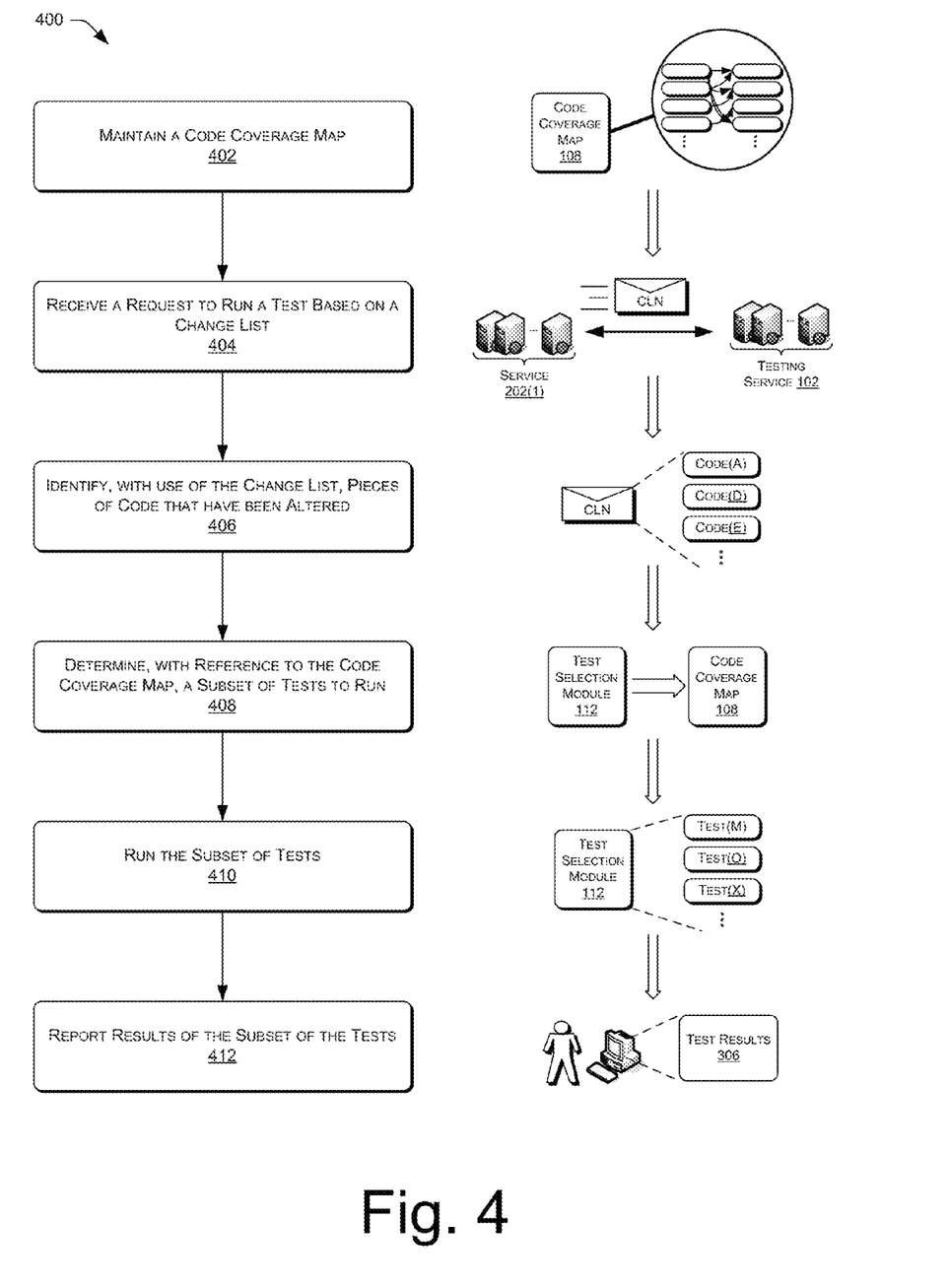
FIG. 4 is an example process that the testing service may implement. This process includes receiving a request to test one or more pieces of code and, in response, running a set of one or more tests on the code that execute the received code.
Figure 5:
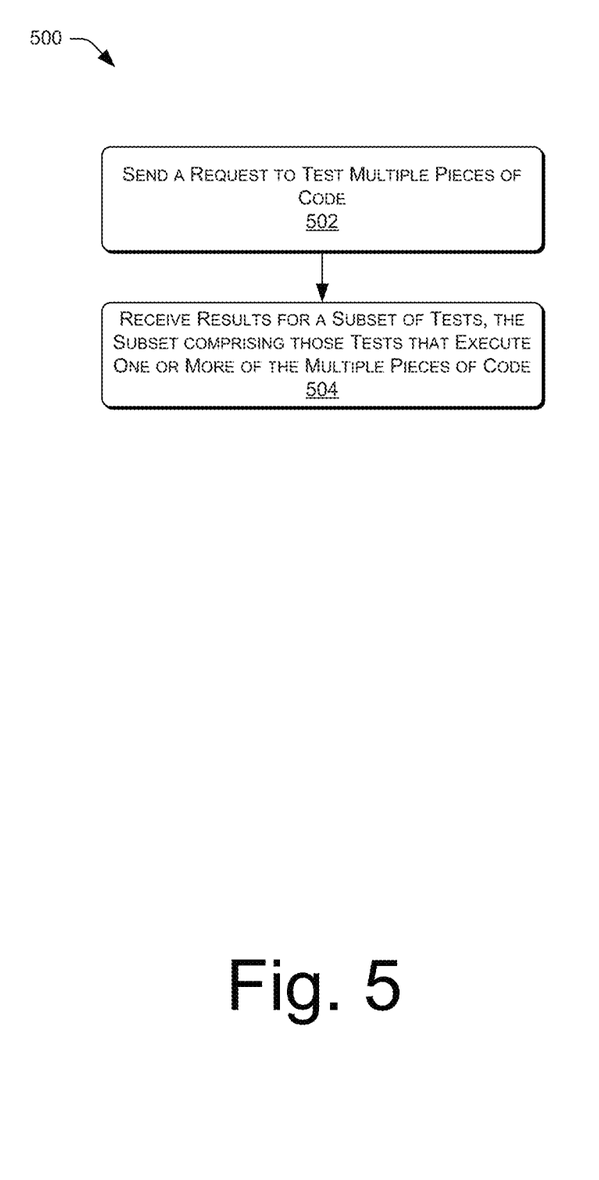
FIG. 5 is an example process that a service of the environment of FIG. 2 may run to test code changes to the service. This process involves sending a request to a testing service, which runs those tests on the code that execute the received code while refraining from running tests that do not execute the code.

FIG. 4 is an example process 400 that the testing service 102 may implement, while FIG. 5 is an example process 500 that one of the services 202(1)-(N) may implement. The testing service and/or the other services of FIG. 2 may perform these processes within the environment 100 of FIGS. 1 and 2, or in any other context or environment. Each of these processes is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 400 includes, at 402, maintaining a code coverage map that maps pieces of code within a software system to those tests that execute the respective piece of code, when performed. For instance, the mapping module 222 may maintain the code coverage map described in detail with reference to FIGS. 1 and 2.

Thereafter, the testing service 102 may receive a request to run a test based on a change list at 404. The change list may be identified by a change list number (CLN) and may comprise a list of the pieces of code that have been altered and are to be tested. In some instances, the change list may additionally or alternatively comprise new code to be tested. At 406, the testing service 102 uses the change list to identify these pieces of code. At 408, the testing service 102 then determines a subset of tests to run on these pieces of code with reference to the maintained code coverage map. As described above, this subset of tests may be unique to the pieces of code being tested and may consist of those tests of the tests 110 that, when performed on the software system, execute the identified pieces of code.

At 410, the testing service 102 runs the determined subset of tests on the identified pieces of code. Further, the testing service 102 may refrain from running other ones of the full set of tests 110, thus completing the testing of the identified code in a timely manner. That is, the testing service 102 may run only those tests that, when performed, actually execute the identified pieces of code, while refraining from running any other tests of the set of tests 110 (that do not execute the identified pieces of code, when performed). Finally, the testing service 102 may report the results of the subset of the tests to the user. For instance, the testing service 102 may provide the results and/or a pointer to the results via email, a command line interface, or in any other manner.

FIG. 5 illustrates the example process 500 that a service, such as the service 202(1) of FIG. 2, may run to test code changes to the service. At 502, the service 202(1) sends, to the testing service 102, a request to test multiple pieces of code. As described above, the testing service 102 may maintain a set of multiple different software tests, such as the tests 110.

Next, at 504 the service 202(1) receives, from the testing service 102, results of testing the multiple pieces of code against a subset of the multiple different software tests. As described above, the subset of tests may comprise those tests that execute one or more ones of the multiple pieces of code. In some instances, the received results may be free from results of tests other than the subset of tests. As such, the developer or other user conducting the tests may receive, in a timely manner, results that are tailored to the pieces of code that that the user altered.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
   maintaining, in a database, a code coverage map that maps individual lines of source code to one or more of multiple different software tests that, when performed, result in testing of the respective lines of the source code;
   accessing, from a developer, a request to run a test based on a unique change list number (CLN) that was generated in response to alterations made to the source code resulting in altered lines of the source code, the unique CLN identifying the altered lines of the source code; and
   at least partly in response to the accessing of the request:
      identifying the altered lines of the source code based at least in part on the unique CLN;
      determining, with reference to the code coverage map, a subset of the multiple different software tests to run to test the altered lines of the source code;
      running the subset of the multiple different software tests corresponding to the altered lines of the source code; and
      causing results of the running of the subset of the multiple different software tests to be reported to the developer.

2. One or more non-transitory computer-readable media as recited in claim 1, further storing computer-executable instructions that, when executed cause the one or more processors to perform acts comprising:
   after the causing the results to be reported to the developer:
      accessing a request to run identified ones of the multiple different software tests corresponding to the altered lines of the source code;
      running the identified ones of the multiple different software tests; and
      causing results of the running of the identified ones of the multiple different software tests to be reported to the developer.

3. One or more non-transitory computer-readable media as recited in claim 1, wherein the developer that provides the request is associated with a particular service within a distributed-services environment, and the multiple different software tests comprise integration tests.

4. A method comprising:
   maintaining, via at least one of one or more computing devices, a code coverage map that maps individual lines of source code to one or more of multiple different software tests that, when performed, test the respective lines of the source code;
   receiving, via at least one of the one or more computing devices, from a user, a request to test altered lines of the source code, wherein the request comprises a unique change list number (CLN) that was generated in response to alterations made to the source code resulting in the altered lines of the source code, the unique CLN identifying the altered lines of the source code; and at least partly in response to the receiving of the request, and via at least one of one or more computing devices:

identifying the altered lines of the source code based at least in part on the unique CLN;

analyzing the code coverage map to determine which of the multiple different software tests, if any, test the altered lines of the source code when performed; and in response to determining that one or more of the multiple different software tests test the altered lines of the source code when performed, running the determined one or more software tests corresponding to the altered lines of the source code.

5. A method as recited in claim 4, further comprising:
in response to determining that none of the multiple different software tests test the altered lines of the source code when performed, providing an error message to the user.

6. A method as recited in claim 4, further comprising:
reporting results of the running of the determined one or more software tests to the user.

7. A method as recited in claim 4, wherein the request comprises a first request, and further comprising:
after the running of the determined one or more software tests, receiving a second request from the user to test the altered lines of the source code; and
running individual ones of the multiple different software tests corresponding to the altered lines of the source code at least partly in response to the receiving of the second request.

8. A method as recited in claim 4, further comprising providing a command line interface to the user, and wherein the request is received via the command line interface.

9. A method as recited in claim 4, wherein the request received from the user specifies whether to run tests that test the altered lines of the source code, a class that includes the altered lines of the source code, or a method that includes the altered lines of the source code.

10. A method as recited in claim 4, wherein the unique CLN maps to the altered lines of the source code in a database, and wherein the identifying comprises identifying the altered lines of the source code in the database based on the unique CLN.

11. A method as recited in claim 10, wherein the unique CLN maps to multiple different lines of the source code that have been altered, and further comprising:
determining the multiple different lines of the source code in the database at least partly in response to the receiving of the request comprising the unique CLN;
analyzing the code coverage map to determine which of the multiple different software tests, if any, test the multiple different lines of the source code when performed; and
running individual software tests determined to test the multiple different lines of the source code.

12. A method as recited in claim 4, wherein the user is associated with a particular service of multiple different services in a distributed-services environment.

13. A method as recited in claim 12, wherein a common entity operates individual ones of the multiple different services in the distributed-services environment, and the multiple different services function to provide and operate a website associated with the common entity.

14. A computing device comprising:
one or more processors; and
one or more computer-readable media storing computer-executable instructions that, when executed, cause the one or more processors to perform a method as recited in claim 4.

15. A system comprising:
at least one computing device configured to implement one or more services, wherein the one or more services are configured to:
receive a request to test a section of source code corresponding to altered lines of the source code indicated by a unique change list number (CLN) that was generated in response to alterations made to the source code resulting in the altered lines of the source code;
identify the altered lines of the source code based at least in part on the unique CLN;
select a subset of multiple tests to run using the section of the source code based at least in part on determining which of the multiple tests test the altered lines of the source code; and
run the subset of the multiple tests corresponding to the altered lines of source code at least partly in response to the receiving of the request.

16. A system as recited in claim 15, wherein the subset of the multiple tests selected to run comprise those tests of the multiple tests that, when performed, execute the section of the source code.

17. A system as recited in claim 15, wherein the one or more services are further configured to run the subset of the multiple tests corresponding to the altered lines of the source code free from running a remainder of the multiple tests corresponding to the section of the source code.

18. A system as recited in claim 15, wherein the one or more services are further configured to:
expose a command line interface to a user that identifies the section of the source code for testing indicated by the unique CLN, the user identifying the section of the source code with use of the command line interface; and
generate results of the running of the subset of the multiple tests.

19. A system as recited in claim 18, wherein the one or more services are further configured to output the generated results or a pointer to the generated results on the command line interface for consumption by the user.

20. One or more non-transitory computer-readable media storing computer-executable instructions that, when executed, cause one or more processors to perform acts comprising:
receiving alterations to multiple pieces of source code corresponding to altered lines of the source code;
in response to the receiving the alterations, generating a unique change list number (CLN) that identifies the altered lines of the source code;
causing transmission, to a testing service, of a request to test the multiple pieces of the source code, wherein the request includes the unique CLN, and wherein the testing service maintains a set of multiple different software tests; and
accessing, from the testing service, results of testing the multiple pieces of the source code against a subset of the multiple different software tests, the subset comprising those tests that test one or more ones of the multiple pieces of the source code and the results being free from other results of tests other than the subset of tests.

21. One or more non-transitory computer-readable media as recited in claim 20, wherein the unique CLN enables the testing service to locate the multiple pieces of the source code.

22. One or more non-transitory computer-readable media as recited in claim 20, wherein the transmission of the request comprises running a script on a command line interface, the script identifying the multiple pieces of source code.

23. One or more non-transitory computer-readable media as recited in claim 22, wherein the accessing of the results comprises accessing the results or a pointer to the results on the command line interface at least partly in response to the running of the script on the command line interface.

24. One or more non-transitory computer-readable media as recited in claim 20, wherein the unique CLN identifies a change list that comprises a list of the multiple pieces of the source code.

\* \* \* \* \*